United States Patent [19]
Klein et al.

[11] 4,387,997
[45] Jun. 14, 1983

[54] PLASTICATING EXTRUDER SCREW CONVEYORS

[75] Inventors: Reuben Klein, Edison; Imrich Klein, Highland Park, both of N.J.

[73] Assignee: Scientific Process & Research, Inc., Somerset, N.J.

[21] Appl. No.: 302,512

[22] Filed: Sep. 16, 1981

Related U.S. Application Data

[63] Continuation-in-part of Ser. No. 104,094, Dec. 17, 1979, Pat. No. 4,290,702.

[51] Int. Cl.³ .............................................. B29B 1/10
[52] U.S. Cl. .................................. 366/79; 366/295; 366/318; 425/208
[58] Field of Search .................. 366/69, 76, 77, 79, 366/88, 90, 91, 92, 81, 318, 319, 323; 425/208, 204; 175/310, 318, 323, 377

[56] References Cited
U.S. PATENT DOCUMENTS 3,698,541 10/1972 Barr .................................. 425/208
3,924,842 12/1975 Klein et al. ........................ 366/79

Primary Examiner—Harvey C. Hornsby
Assistant Examiner—Shewen Bian
Attorney, Agent, or Firm—Samuelson & Jacob

[57] ABSTRACT

A plasticating extruder in which the screw conveyor includes an inner backfeed passage communicating with the channel established by the main flight of the screw conveyor and a solids-directing flight for directing unplasticated material into the backfeed passage and segregating already-plasticated material from the unplasticated material in the channel.

8 Claims, 11 Drawing Figures

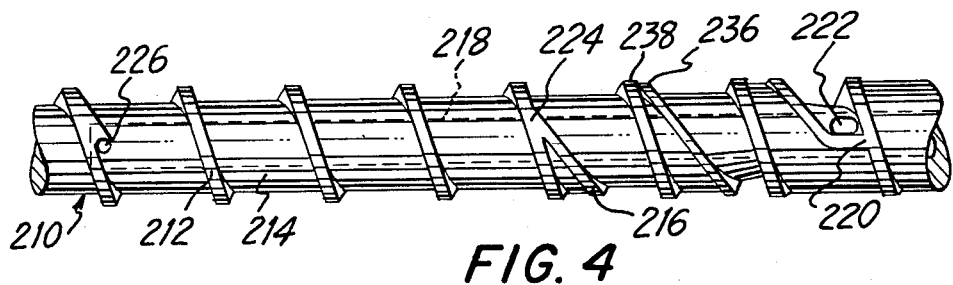
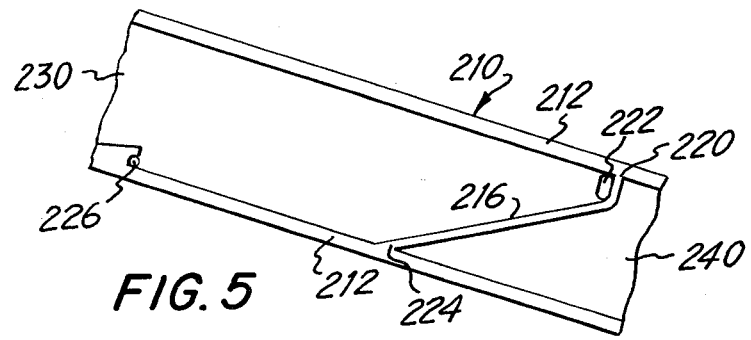
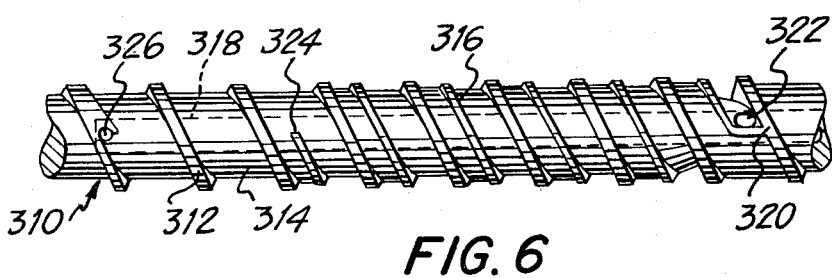
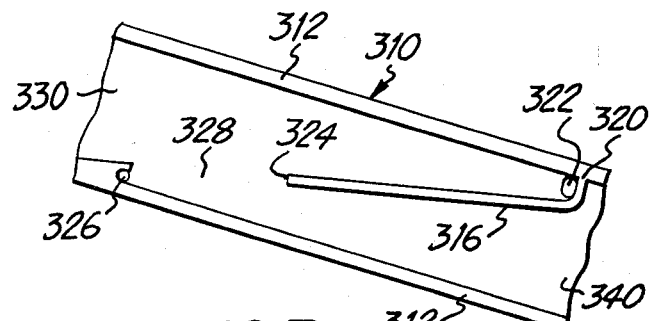
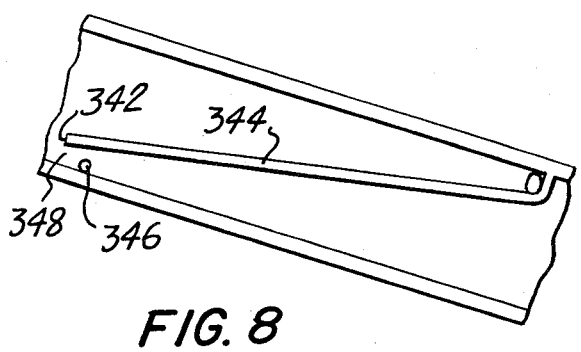

PLASTICATING EXTRUDER SCREW CONVEYORS

This application is a continuation-in-part of application Ser. No. 104,094, filed Dec. 17, 1979, now U.S. Pat. No. 4,290,702.

The present invention relates generally to plasticating extruders and pertains, more specifically, to screw conveyors which attain improved melting of solids introduced into plasticating extruders employing such screw conveyors.

In U.S. Pat. No. 3,924,842, there is disclosed plasticating apparatus in which the screw conveyor includes an internal passage which communicates with the external main channel of the screw conveyor at locations enabling unmelted solids to enter the passage at a downstream location and proceed upstream to be melted and reintroduced into the main channel at an upstream location, thereby facilitating the entire plasticating operation.

In our earlier patent application, Ser. No. 104,094, filed Dec. 17, 1979, now U.S. Pat. No. 4,290,702, we disclosed a screw conveyor having an internal backfeed passage and a secondary, solids-directing flight located on the screw conveyor for directing unplasticated material into the backfeed passage.

An object of the present invention is to provide an improvement in a screw conveyor structure of the type set forth in the above-noted patent and patent application whereby the screw conveyor is rendered even more effective in attaining efficient melting.

Another object of the invention is to provide a screw conveyor construction of the type described above and in which a secondary, solids-directing flight is employed in conjunction with the primary, main flight and an internal backfeed passage to direct unplasticated material into the backfeed passage and to segregate the already-plasticated material from the unplasticated material in the main channel, for more effective melting.

Still another object of the invention is to provide a screw conveyor of the type described and in which unmelted solids are funnelled, in a more positive manner, into the backfeed passage, for recycling or recirculation until the material is melted, without stopping the flow of material.

Yet another object of the invention is to provide a screw conveyor of the type described and in which the secondary, solids-directing flight is constructed in alternate configurations for accommodating different operating conditions.

A further object of the invention is to provide a screw conveyor of the type described and which is compatible for use in current extrusion apparatus.

The above objects, as well as still further objects and advantages, are attained by the present invention which may be described briefly as apparatus for use in a plasticating extruder of the type having an elongate barrel for preparing a plasticated material from solids introduced into the extruder, the apparatus comprising: a first screw conveyor for placement in the barrel, the first screw conveyor including a main flight defining a channel for continuously conveying the material in a downstream direction as the material is melted within the channel, the flight having a leading face facing downstream and a trailing face facing upstream, the channel extending between the leading face and the trailing face; a backfeed passage within the first screw conveyor, the backfeed passage communicating with the channel at a downstream location and at an upstream location to establish an extended flow circuit along which the material will move through the channel and the backfeed passage, the downstream location being in position to receive at least some unplasticated material from the channel, and the upstream location being spaced axially upstream of the downstream location a distance sufficient to enable plastication within the backfeed passage of at least some of the unplasticated material admitted to the backfeed passage; a second screw conveyor located in the backfeed passage and arranged to convey material from the downstream location to the upstream location so as to enable recirculation of material along the extended flow circuit through the backfeed passage; and a solids-directing flight on the first screw conveyor for directing unplasticated material into the backfeed passage and tending to segregate the already-plasticated material from the unplasticated material in the channel.

The invention will be more fully understood, while still further objects and advantages will become apparent, in the following detailed description of preferred embodiments illustrated in the accompanying drawing, in which:

FIG. 4 is a fragmentary side elevational view of another screw conveyor embodying the present invention;

FIG. 5 is a diagram depicting the arrangement of flights on the screw conveyor of FIG. 4;

FIG. 6 is a fragmentary side elevational view of still another screw conveyor embodying the present invention;

FIG. 7 is a diagram depicting the arrangement of flights on the screw conveyor of FIG. 6;

FIG. 8 is a diagram depicting another alternate arrangement of flights on another screw conveyor somewhat similar to the screw conveyor of FIG. 6;

Figure 1:
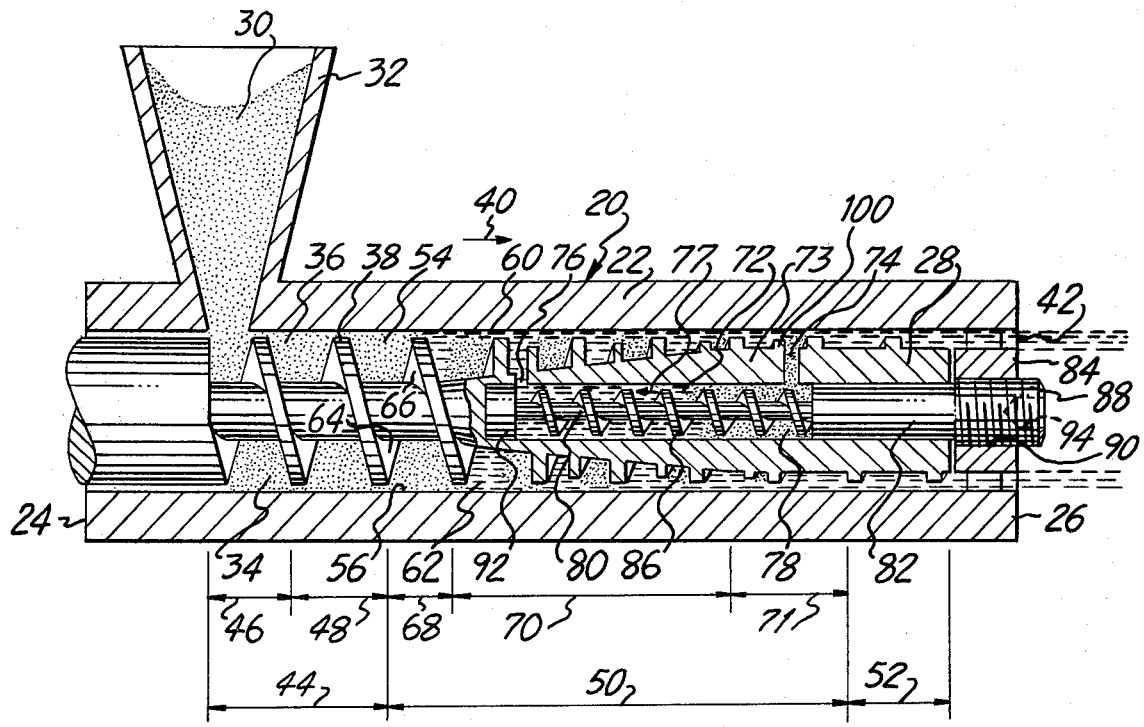
FIG. 1 is a somewhat schematic representation of a plasticating extruder illustrating a screw conveyor constructed in accordance with the invention.

Referring now to the drawing, and especially to FIG. 1 thereof, a plasticating extruder constructed in accordance with the invention is illustrated somewhat schematically at 20. Extruder 20 includes a barrel 22, extending axially between an upstream end 24 and a downstream end 26, and a screw conveyor 28 in the barrel. A reservoir of solid material 30 is held in a hopper 32 which communicates with the inner chamber 34 of the barrel 22 adjacent the upstream end 24 and feeds the solid material 30 into a channel 36 defined by a helical flight 38 on the screw conveyor 28. Rotation of the screw conveyor 28 within the barrel 22 will advance the material 30 along the channel 36 in a downstream direction 40 until the material is delivered in melted form, to a discharge point 42 at the downstream end 26 of the barrel.

Extruder 20 is divided into functional zones; namely, a solids conveying zone 44, which includes a hopper zone 46 and a delay zone 48, a melting zone 50, and a melt conveying zone 52. The solids are compacted into a solid bed 54 and, where the inner surface 56 of the barrel 22 reaches the melting point of material 30, the resulting melt forms a continuous film 60.

In the melting zone 50, a melt pool 62 begins to form, cross-channel between the leading face 64 of flight 38, which faces downstream, and the confronting trailing face 66 of flight 38, which faces upstream. The melt pool 62 is juxtaposed with the leading face 64 of flight 38 and gradually replaces the progressively melting solid bed 54 along the melting zone 50. The melt film 60 is continuously fed from the solid bed 54 and, as the volume of the solid bed decreases, and the volume of the melt increases, the melt spills into the low shear melt pool 62, all as explained in the above cited U.S. Pat. No. 3,924,842.

Melting zone 50 itself is divided into three geometrical sections; namely, a relatively deep section 68, of essentially constant depth, a compression section 70 downstream of the deep section 68 and having a depth which decreases in the downstream direction, and a relatively shallow section 71 of essentially constant depth downstream of the compression section 70. Extruder 20 has a backfeed passage 72 extending through the interior of the arbor 73 of screw conveyor 28. Passage 72 communicates with channel 36 at a downstream location at an opening 74 and at an upstream location at an opening 76. Opening 74 is a drainage opening for unmelted solids and is positioned with respect to the channel 36 such that unmelted solids will enter the passage 72 and will travel in an upstream direction 77. The opening 76 is a melt-return aperture and is positioned with respect to the channel 36 such that the drained material 78 passing through the passage 72 will be reintroduced into the channel upstream of any potential blockage. Opening 74 is located adjacent to and preferably immediately behind trailing face 66 of flight 38 to assure that unmelted solids will pass through opening 74. Opening 76 is located adjacent to and preferably immediately ahead of leading face 64 of flight 38 so that the drained material 78 which passes through passage 72 re-enters channel 36 at a location where there is likely to be melted material. At least part of the drained material 78 ordinarily will be melted as it travels along passage 72 so that the drained material will be reintroduced into channel 36 in at least partially melted form. Thus, melting efficiency is increased and the quality of the extrudate is enhanced. More than one opening 74 may be provided at the downstream location and, likewise, a plurality of openings 76 may be provided at the upstream location. The passage 72 preferably extends along the central longitudinal axis of the screw conveyor 28 and each opening 74 and 76 extends laterally through the screw conveyor 28, in a radial direction, from the channel 36 to the interior passage 72.

In order to facilitate movement of the drained material 78 in the upstream direction and thereby attain the desired effectiveness of interior passage 72, a second or inner screw conveyor is inserted into passage 72, as shown at 80. Inner screw conveyor 80 extends axially along interior passage 72 and has an arbor 82 which is affixed to barrel 22 at 84. A flight 86 extends along the length of the inner screw conveyor 80 within the passage 72. Since the inner screw conveyor 80 is fixed to the barrel 22, it remains stationary relative to the rotating outer screw conveyor 28. Hence, flight 86 is "flighted" in the same direction as flight 38 of screw conveyor 28; that is, the helix followed by flight 86 extends in the same direction as the helix of flight 38. In this manner, flight 86 exterts a force upon the drained material 78 in the upstream direction 77 from opening 74 toward opening 76.

A positive control over the amount of material permitted to pass through passage 72, when the passage is provided with an inner screw conveyor 80, is provided by enabling longitudinal adjustment of the inner screw conveyor 80 relative to the outer screw conveyor 28. Thus, the arbor 82 of the inner screw conveyor 80 can be provided with a threaded extension 88 at one end thereof which engages a complementary threaded aperture 90 in the barrel 22 of the extruder. A valve shoulder 92 is integral with the opposite end of the inner screw conveyor 80 adjacent opening 76 in the outer screw conveyor 28. Selective rotation of the inner screw conveyor 80 within the threaded aperture 90, as by engagement of a hexagonal socket 94 with an appropriate tool, will advance or retract the shoulder 92 relative to opening 76, thereby enabling partial closing of opening 76 and regulation of the volume of drained material. Alternately, a shoulder similar to shoulder 92 can be provided adjacent opening 74 to attain the desired regulation.

Experience has demonstrated that the separation of solids from the melt, with the recirculation or recycling of the separated solids, has resulted in a decrease in the amount of energy required to achieve complete plastication while realizing improved throughput quality in the extrudate. As set forth in greater detail in our article titled "THE SOLIDS-DRAINING SCREW: A NEW TWIST FOR EXTRUSION", published in the October 1979 issued of Plastics Engineering, the separation of already-melted plastic from unmelted solids results in increased efficiency and higher quality extrudate. In order to accomplish more effective separation of the unmelted solids from the already plasticated material, and then enable plastication of the separated solids, a solids-directing flight 100 is placed on the main screw conveyor 28 and is arranged so as to funnel the unmelted solids into the drainage opening 74 while, at the same time, diverting unmelted solids away from the melt-return opening 76 so as to enable unobstructed return of melted material from the backfeed passage 72 to the main channel 36. Thus, the solids-directing flight 100 directs unplasticated material into the backfeed passage 72 to establish an extended flow circuit for the separated solids, and the unplasticated material is segregated from the already plasticated materials which need not flow through the extended flow circuit.

Figure 2:
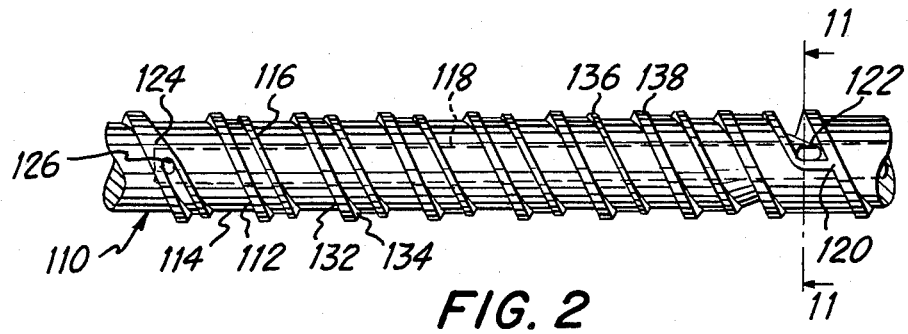
FIG. 2 is a fragmentary side elevational view of a screw conveyor of the type shown in FIG. 1.
Figure 3:
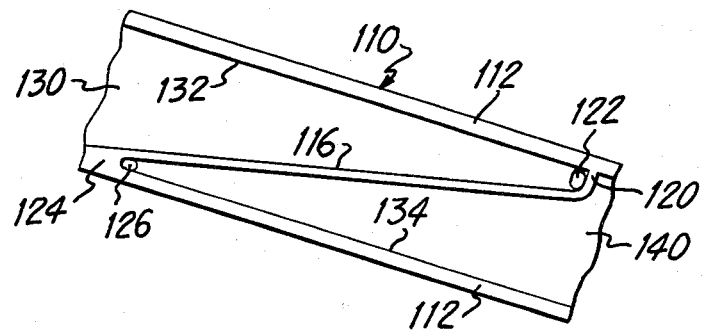
FIG. 3 is a diagram depicting the arrangement of flights on a screw conveyor such as that of FIG. 2.

Turning now to FIGS. 2 and 3, a screw conveyor constructed in accordance with the invention is shown at 110 and is seen to include a main flight 112, defining a main channel 114, and a secondary, solids-directing flight 116 establishing an extended flow circuit in a configuration which may be referred to as an "isolated circuit" for the recycling of unmelted solids through a backfeed passage 118. In the illustrated isolated circuit arrangement, the solids-directing flight 116 intersects with the main flight 112 at both downstream location 120, just downstream of drainage opening 122, and upstream location 124, just upstream of melt-return aperture 126. The axial distance between the solids-directing flight 116 and the main flight 112 is varied along the screw conveyor 110 to enable the accommodation of relatively more melted material and less unmelted solids as the flights proceed downstream.

Incoming material enters the circuit at 130, with the solid bed juxtaposed with the trailing face 132 of the main flight 112 and the melt pool juxtaposed with the leading face 134. As melting continues, the melt pool grows and occupies the increasing portion of the cross-section of the main channel lying between the leading face 134 and the solids-directing flight 116. It is noted that the crown 136 of the solids-directing flight 116 is located radially inwardly of the crown 138 of the main flight 112 so that melted material can flow over the crown 136 and continue downstream. The melted material thus leaves the isolated circuit at 140 and proceeds to the discharge end of the extruder within which screw conveyor 110 operates. However, unmelted solids are guided by the solids-directing flight 116 into the drainage opening 122 for recycling through backfeed passage 118 to be discharged as melt at the melt-return aperture 126. As described in connection with the apparatus of FIG. 1, a second screw conveyor is placed in the backfeed passage to facilitate the movement of drained material in an upstream direction.

In the embodiment illustrated in FIGS. 4 and 5, screw conveyor 210 includes a main flight 212, defining a main channel 214, and a secondary, solids-directing flight 216 establishing an extended flow circuit in a configuration which may be referred to as a "multiple circuit" for the recycling of unmelted material through a backfeed passage 218. In this instance, the solids-directing flight 216 intersects with the main flight 212 at a downstream location 220, just downstream of drainage opening 222, and an upstream location 224 which now is downstream of melt-return aperture 226, intermediate the drainage opening 222 and the melt-return aperture 226.

Incoming material enters the circuit at 230. Melted material may leave the circuit only by passing over the solids-directing flight 216. Thus, the crown 236 of the solids-directing flight 216 is located radially inwardly of the crown 238 of the main flight 212 so as to provide greater clearance for the flow of melted material out of the circuit at 240. Alternately, the solids-directing flight 216 may be provided with narrow slots (not shown) which will enable the passage of melted material while holding back unmelted solids for recycling. The unmelted solids are directed, or funnelled, to the drainage opening 222 for entry into the backfeed passage 218. The multiple circuit continues to recycle unmelted material as long as unmelted material remains, while melted material is permitted to leave the circuit and continue downstream.

Referring to FIGS. 6 and 7, a further embodiment of the invention is illustrated in the form of screw conveyor 310 having a main flight 312, defining a main channel 314, and a secondary, solids-directing flight 316 establishing an extended flow circuit in a configuration which may be referred to as an "open circuit" for the recycling of unmelted material through a backfeed passage 318. In the present embodiment, the solids-directing flight 316 again intersects with the main flight 312 at a downstream location 320, just downstream of drainage opening 322, but terminates at an upstream terminal end 324 spaced from the main flight 312. Thus, upstream terminal end 324 is located downstream of the melt-return aperture 326, leaving a gap 328 between the melt-return aperture 326 and the secondary, solids-directing flight 316.

As a result of gap 328, some of the incoming material which enters at 330 can bypass the circuit and pass through gap 328 to be mixed with material emerging from melt-return aperture 326. The present arrangement is utilized to enhance mixing or to lower temperature by reducing the shearing of molten material which otherwise would pass over the solids-directing flight 316. Again, the solids-directing flight 317 funnels unmelted material to the drainage opening 322 and tends to keep the melt-return aperture 326 unobstructed for easing the return of melted material from the backfeed passage 318 to the main channel 314, but gap 328 enables some bypass to take place as material flows out of the circuit at 340.

In FIG. 8, the upstream terminal end 342 of alternate solids-directing flight 344 is located upstream of the melt-return aperture 346, placing a gap at 348. The operation is similar to that of the embodiment of FIGS. 6 and 7, with the exception that a greater amount of material will contact the solids-directing flight 344, with less material passing through gap 348 than in the earlier-described embodiment of FIGS. 6 and 7.

Figure 9:
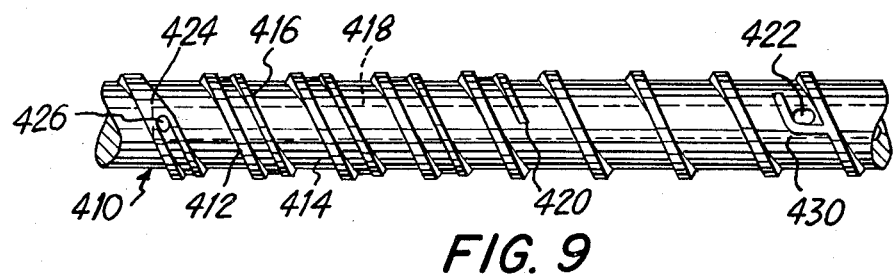
FIG. 9 is a fragmentary side elevational view of yet another screw conveyor embodying the present invention.
Figure 10:
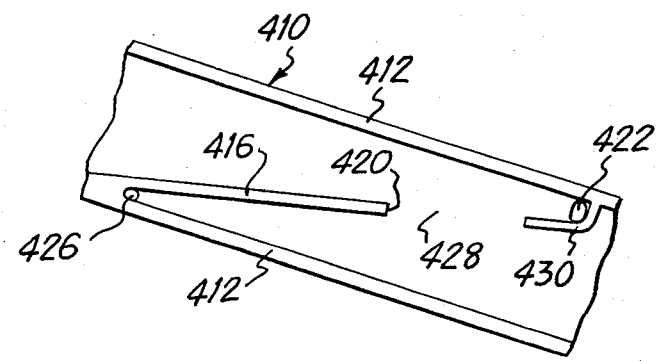
FIG. 10 is a diagram depicting the arrangement of flights on the screw conveyor of FIG. 9.

The embodiment of FIGS. 9 and 10 employs a screw conveyor 410 having a main flight 412, defining a main channel 414, and a secondary, solids-directing flight 416 establishing another open circuit for the recycling of unmelted material through a backfeed passage 418. Here, the solids-directing flight 416 includes a downstream terminal end 420 spaced upstream from the drainage opening 422. The solids-directing flight 416 intersects with the main flight 412 at an upstream location 424, just upstream of the melt-return aperture 426. Thus, a gap 428 is established between the downstream terminal end 420 and a further solids-directing flight segment 430 which is juxtaposed with the drainage opening 422.

Gap 428 enables some bypass to take place in the vicinity of the unmelted solids so as to enable only partial recycling with concomitant lower temperatures resulting from reduced shearing of any excess volume of unmelted material which could not be accommodated by the backfeed passage 418. Segment 430 serves to direct those unmelted solids which can be accommodated by the backfeed passage 418 into the drainage opening 422 for recirculation.

It is noted that in all of the above-described embodiments, the solids-directing flight serves to enhance the flow of material through an extended flow circuit, thereby diverting flow without forming a complete barrier to the continuous flow of material.

While in each of the above-described embodiments, the lead of the main flight and the lead of the solids-directing flight each is shown as being constant along the length of the screw conveyor, it will be apparent that these leads need not be constant but can be varied along the screw conveyor in accordance with the requirements of particular processing objectives.

Figure 11:
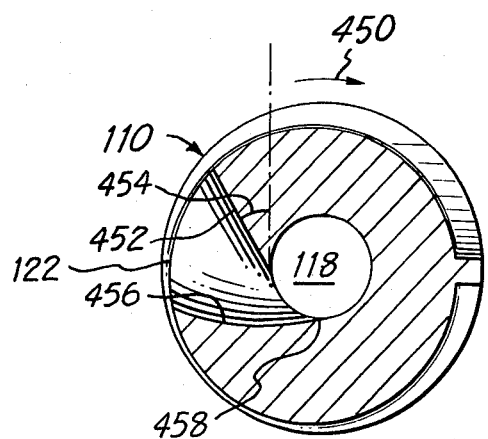
FIG. 11 is an enlarged lateral cross-sectional view taken along line 11—11 of FIG. 2.

Turning now to FIG. 11, in order to facilitate further the flow of unmelted solids through the drainage opening 122 and into the backfeed passage 118 of screw conveyor 110, drainage opening 122 is provided with a flared lateral cross-sectional configuration oriented so that the flared, or funnel-shaped, contour tends to enhance movement of the unmelted solids through the drainage opening and into the backfeed passage in response to rotation of the screw conveyor. Thus, screw conveyor 110 is rotated in a clockwise direction, as viewed in FIG. 11, in the direction of arrow 450. The leading surface 452 of opening 122 makes a relatively small acute angle 454 with the backfeed passage 118 while the trailing surface 456 is slightly concave, in a bucket-like contour, and is essentially tangent to the backfeed passage 118 at 458. Rotation of the screw conveyor 110 in the direction of arrow 450 will tend to scoop material into the drainage opening 122 and move the material into the backfeed passage 118. While FIG. 11 depicts drainage opening 122, it is to be understood that the drainage openings of all of the illustrated embodiments may be provided with a similar contour.

It is to be understood that the above detailed description of embodiments of the invention are provided by way of example only. Various details of design and construction may be modified without departing from the true spirit and scope of the invention as set forth in the appended claims.

The embodiments of the invention in which an exclusive property or privilege is claimed are defined as follows:

1. Apparatus for use in a plasticating extruder of the type having an axially extending elongate barrel for preparing a plasticated material from solids introduced into the extruder, said apparatus comprising:

a first screw conveyor for placement in the barrel, said first screw conveyor including a main flight defining a channel for continuously conveying the material in a downstream direction as the material is melted within the channel, said flight having a leading face facing downstream and a trailing face facing upstream, said channel extending between the leading face and the trailing face;

a backfeed passage within the first screw conveyor, said backfeed passage communicating with the channel at a downstream location and at an upstream location to establish an extended flow circuit along which the material will move through the channel and the backfeed passage, the downstream location being in position to receive at least some unplasticated material from the channel, and the upstream location being spaced axially upstream of the downstream location a distance sufficient to enable plastication within the backfeed passage of at least some of the unplasticated material admitted to the backfeed passage;

a drainage opening interconnecting the channel and the backfeed passage at the downstream location for enabling the flow of unplasticated material into the backfeed passage at the downstream location;

a melt-return aperture interconnecting the backfeed passage and the channel at the upstream location for enabling the flow of plasticated material from the backfeed passage to the channel at the upstream location;

a second screw conveyor located in said backfeed passage and arranged to convey material from the downstream location to the upstream location so as to enable recirculation of material along the extended flow circuit through the backfeed passage; and a solids-directing flight on the first screw conveyor extending along the channel between the melt-return aperture and the drainage opening, the axial distance between the solids-directing flight and the main flight being varied along the first screw conveyor for directing unplasticated material into the drainage opening while diverting unplasticated material away from the melt-return aperture for unobstructed return of plasticated material from the backfeed passage to the channel and segregation of at least some of the returned plasticated material from the unplasticated material in the channel such that the segregated already plasticated material will not flow through the extended flow circuit.

2. The invention of claim 1 wherein the solids-directing flight intersects the main flight immediately downstream of the drainage opening.

3. The invention of claim 2 wherein the solids-directing flight intersects the main flight immediately upstream of the melt-return aperture.

4. The invention of claim 2 including a gap in the solids-directing flight, the gap being located axially between the melt-return aperture and the drainage opening.

5. The invention of claim 4 wherein the gap is located adjacent the melt-return aperture.

6. The invention of claim 4 wherein the gap is located adjacent the drainage opening.

7. The invention of claim 1, 2, 3, 4, 5 or 6 wherein the drainage opening includes a lateral cross-sectional configuration which is flared outwardly from the backfeed passage to the channel to enhance the flow of unplasticated material from the channel into the backfeed passage in response to rotation of the first screw conveyor.

8. The invention of claim 7 wherein the drainage opening includes a concave surface for moving unplasticated material through the drainage opening in response to rotation of the first screw conveyor.

* * * * *